(12) United States Patent
Buthker et al.

(10) Patent No.: US 9,112,443 B2
(45) Date of Patent: Aug. 18, 2015

(54) CURRENT CONTROLLED ACTUATOR DRIVER WITH IMPROVED ACCURACY AT LOW CURRENT

(75) Inventors: Henricus Cornelis Johannes Buthker, Eindhoven (NL); Luc van Dijk, Nijmegen (NL)

(73) Assignee: NXP B.V., Eindhoven (NL)

( * ) Notice: Subject to any disclaimer, the term of this patent is extended or adjusted under 35 U.S.C. 154(b) by 534 days.

(21) Appl. No.: 13/598,976

(22) Filed: Aug. 30, 2012

(65) Prior Publication Data

US 2014/0062539 A1 Mar. 6, 2014

(51) Int. Cl.
*H03K 3/00* (2006.01)
*H02P 25/00* (2006.01)

(52) U.S. Cl.
CPC ..................................... *H02P 25/00* (2013.01)

(58) Field of Classification Search
CPC ................................................ H03K 19/00361
USPC ........................................................ 327/108
See application file for complete search history.

(56) References Cited

U.S. PATENT DOCUMENTS

2011/0115399 A1* 5/2011 Sadwick et al. .............. 315/287

OTHER PUBLICATIONS

Horn, W. et al., A 4-Channel High-Precision Constant Current Control ASIC for Automotive Transmission Applications, IEEE 2006 CICC, 2006 1-4244-0076-7/06, pp. 21-1-1 thru 21-1-4,Infineon Technologies Austria AG.
Infineon Technologies AG, TLE7242-2G 4 Channel Fixed Frequency Constant Current Control IC, Edition May 27, 2011, Munich, Germany.

* cited by examiner

*Primary Examiner* — Daniel Puentes

(57) ABSTRACT

Various exemplary embodiments relate to a current driver for controlling a current source controlled by an alternating current (AC) signal, including: a current sensor configured to measure an output current from the current source; a threshold detector configured to detect when the measured current is below a threshold value; and a controller configured to control the current source using a duty cycle of the AC signal when the measured current is below the threshold.

20 Claims, 3 Drawing Sheets

CURRENT CONTROLLED ACTUATOR DRIVER WITH IMPROVED ACCURACY AT LOW CURRENT

TECHNICAL FIELD

Various exemplary embodiments disclosed herein relate generally to current controlled actuator drivers with improved accuracy at low current.

BACKGROUND

Current driven actuators are finding wider use in mechanical systems. Present actuator driver integrated circuits may use current control systems. The driver may use a peak current mode, an average current mode, or an hysteretic current control mode, but all drivers have in common that the current is measured and controlled by means of a variable duty-cycle or on-time. For example a current driven actuator may be used in various automotive applications, for example, braking systems. Such systems often have operating modes that require operation at low currents but with high precision, in order to produce precise motion.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a current driver for controlling a current source controlled by an alternating current (AC) signal, including: a current sensor configured to measure an output current from the current source; a threshold detector configured to detect when the measured current is below a threshold value; and a controller configured to control the current source using a duty cycle of the AC signal when the measured current is below the threshold.

Various exemplary embodiments relate to a method for driving a current source, including: calibrating the current source; determining that the desired current source output current is below a threshold; determining a duty cycle for use in driving the current source based upon calibration of the current source and the desired output current; and applying an alternating current signal with the determined duty cycle to the current source.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Current driven actuators use current sensing circuits to control the current supplied to the actuator. Present current driven actuators have the problem of the accuracy of the current sensing circuits. Current sensing circuits essentially measure the current through a resistor or switch, by monitoring the voltage across it and comparing the measured voltage to a known voltage. In general, these circuits have a gain error and an offset. The gain error will result in deviations at large currents, the offset results in errors at low current. Because the resistance of the measuring device is very low, a small offset may result in a large error in current. Therefore it is desirable to reduce the influence of offsets in the current measuring circuits, especially when measuring small currents.

In present actuator driver circuits, the current may be controlled by means of a switching regulator. The duty-cycle of the switch may determine the fraction of the battery voltage that is applied to the actuator and thus the current through the actuator. At low currents, the duty-cycle is low. Essentially, there is a linear relation between duty-cycle and current as described in the following equation:

$$I_{coil}(\delta, V_{bat}) = \frac{\delta \cdot V_{bat}}{R},$$

where $\delta$ is the duty cycle, $V_{bat}$ is the battery voltage, and R is the resistance of the coil in the actuator. The absolute value of the current may depend on battery voltage and resistances in the circuit. The battery voltage may change relatively fast, but the resistances, dominated by the actuator resistance itself, may be rather constant. At a high current, the influence of offset in the measurement is small, so typical current loop control methods lead to acceptable precision, but for low currents, the current may instead be controlled using the duty-cycle. The battery voltage may be measured by the system for other purposes and may be used to compensate for variations. Because the resistance varies with temperature, a calibration may be performed before each low current cycle.

Figure 1:
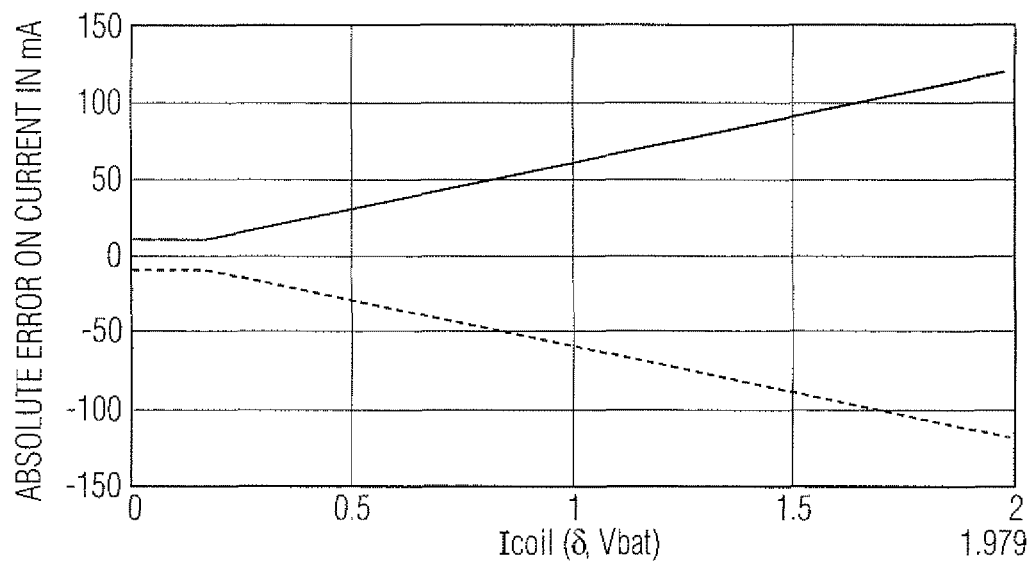
FIG. 1 is a plot illustrating this current error in milliamps for a current sensing circuit controlled by a switching regulator.

The required current accuracy may be specified in two ways. First, for large currents, the error is a percentage of the DC current. Second, for small currents, the error is a fixed value. It is desirable to minimize this fixed value. In one example, the accuracy at low currents is 10 mA and at high currents it is 6% of the current value. FIG. 1 is a plot illustrating this current error in milliamps for a current sensing circuit controlled by a switching regulator.

Figure 2:
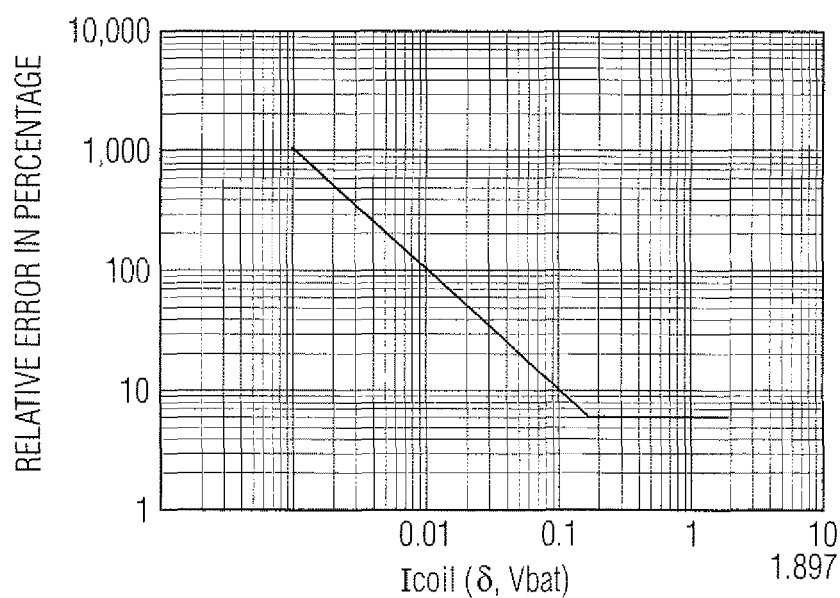
FIG. 2 is a plot illustrating the error percentage versus current and hence the effect of a fixed current offset error versus current level.

Fixed current offset errors lead to decreased current accuracy for low current. FIG. 2 is a plot illustrating the error percentage versus current and hence the effect of a fixed current offset error versus current level. As can be seen, below 10 mA, the error is more than 100%.

Figure 3:
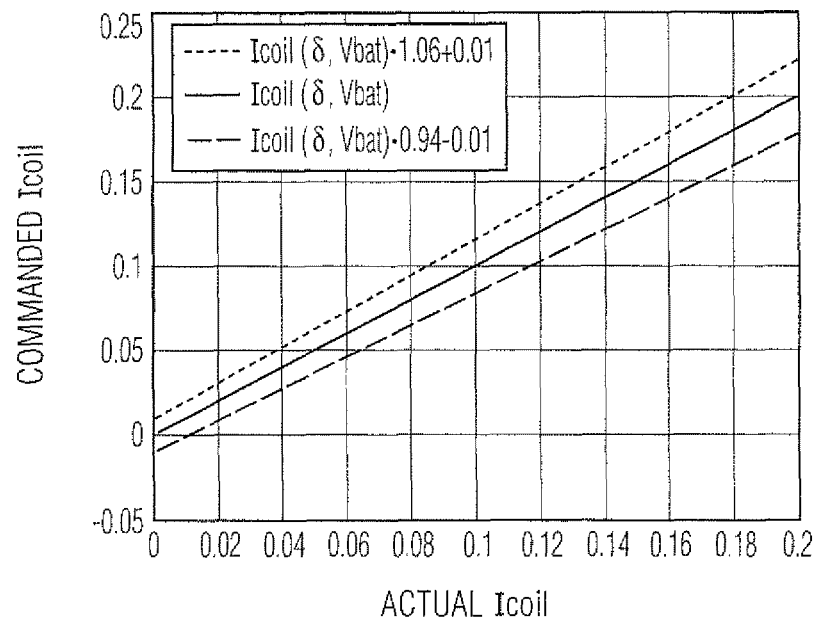
FIG. 3 is a plot illustrating the absolute relation between current setpoint and actual current value.

FIG. 3 is a plot illustrating the absolute relation between current setpoint and actual current value for a current offset error of 10 mA and 6% of the current value. As can be seen, for low currents, the absolute errors are not very large, but the relative error increases. As can be seen in the plot, because of the offset, the current set point may even become negative.

In a current sensor, the current may be measured as a voltage across a low-ohmic device. Typical values may be 0.1Ω or 0.2Ω. Because the current may be up to 2 A, a low value may help to keep the dissipation low. The maximum measured voltage then may be 200 mV and the maximum dissipation may be 400 mW. The resistance of the actuator coil may be much higher, for example, on the order of 3Ω to 7Ω.

For example, an error of 10 mA in a 0.1Ω sensing device is 1 mV offset. This is extremely small. Normal offsets may be 5 mV to 20 mV. Because of the high inductance of the coil, typically 15 to 25 mH, the switching frequency may be low. It may be on the order of 4 kHz which provides a 250 µs cycle time. A deviation of 10 mA over 3Ω results in a 30 mV voltage deviation. If 250 µs is equivalent to 14.4 V (a typical automotive battery voltage), then 30 mV is equivalent to 520 ns. So if the duty-cycle may be controlled in steps of 520 ns, the corresponding current steps would be 10 mA which is within the required accuracy.

In modern integrated circuits, the clock frequency may be as high as 40 MHz or more. The resulting time resolution of 25 ns would be equivalent to 0.5 mA which provides more than enough precision.

In order to control the drive current precisely using duty cycle, the relationship between duty-cycle and current should be determined. It may be determined for a medium to high current, e.g., at start-up. The battery voltage may vary wildly for different operating conditions, like cranking, braking etc., but the resistance of the actuator will be rather constant. It mostly varies with temperature.

In order to compensate for the current offset, the actuator driver circuit may switch to a time-controlled operation for currents below a certain threshold. The value of the threshold may be between 10% and 25% of the maximum current. Further, the threshold may also, be anywhere from 5% to 30% of the maximum current. The specific value of the threshold may be driven by various component and system parameters, system performance requirements, and any desired design margin.

Figure 4:
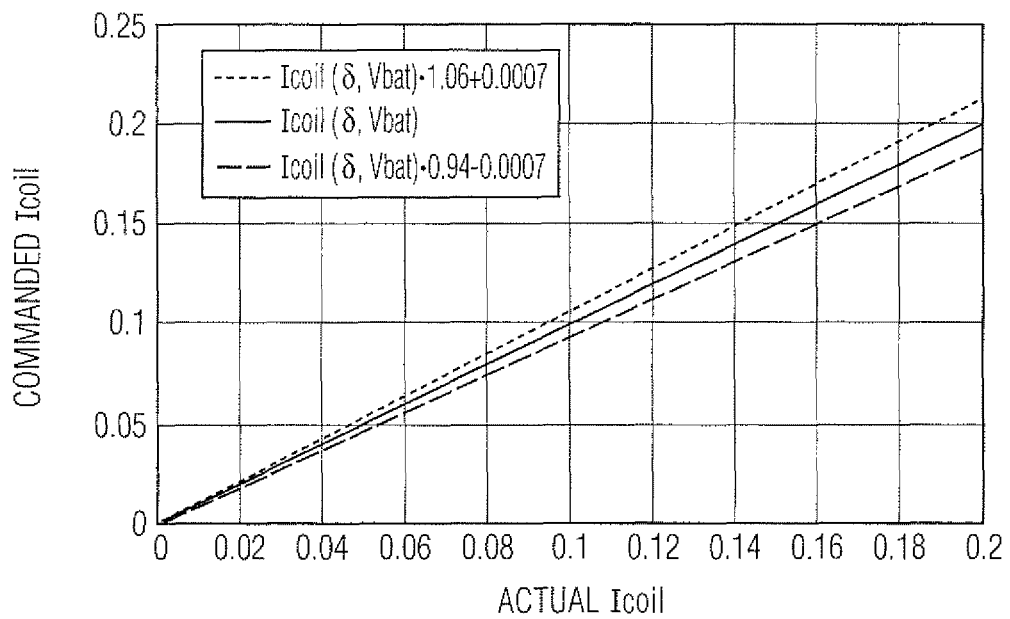
FIG. 4 is a plot illustrating the absolute relation between current setpoint and actual current value according to the above discussed embodiment.

For time controlled operation, assuming the battery voltage may be measured with 100 mV resolution (about 1%) and the current at high levels may be measured with e.g. 3% accuracy, the accuracy at low currents may be 3%+1%=4%. Accordingly, the influence of the offset of the current sense amplifier may be greatly reduced. FIG. 4 is a plot illustrating the absolute relation between current setpoint and actual current value when time controlled operation is utilized.

A comparison of FIG. 3 to FIG. 4 illustrates an improvement at low currents. At high currents, the performance of the described embodiment is essentially the same as that described in FIG. 3.

The resistance of the actuator coil may vary widely as a function of temperature. For improved current accuracy, the actuator drive circuit may calibrate the drive current based upon the resistance of the actuator. There may be several ways to do this. One calibration method includes applying a low voltage to the actuators and measuring the current. The low voltage will prevent noticeable actions. The disadvantage of this method may be that the accuracy is reduced. Another calibration method may include applying a short pulse to the actuator. The time constant of the actuator, for example, may be between 2 ms and 8 ms. If the applied pulse is in the order of 5 ms, the current will have reached a value close to its end value. As a result, the length of the pulse may be too short to have a noticeable effect on the mechanics. Calibration may be best done just before a low current action may be required, but still allow for calibration. So when a low-current, high-precision signal is required, a calibration operation may be performed. This phase is very short, but long enough to reach a high current in order to calibrate the system. The time may be programmable, to accommodate for variations in actuator parameters. Further, while in a low current mode, the actuator may not heat up much, so the resistance does not significantly vary. This is unlike high current modes that may heat up the actuator and cause changes to the resistance, but then the actual current may be measured and controlled for this situation. Also, for a faster decay of the current after the measuring pulse, the synchronous rectification may be disabled.

Figure 5:
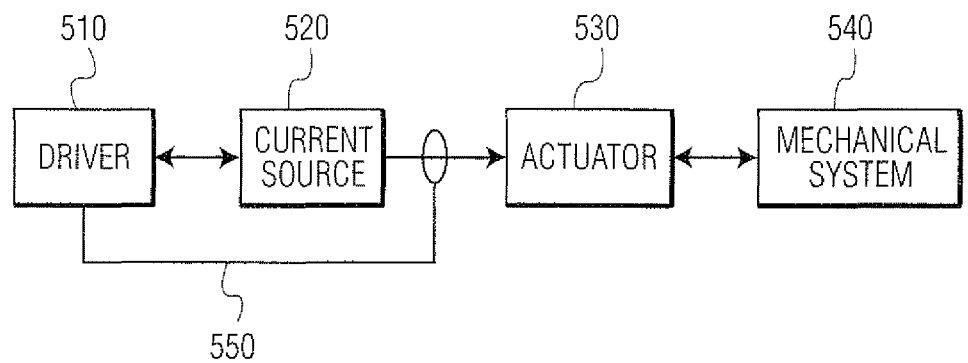
FIG. 5 illustrates a block diagram for a mechanical system including a current driven actuator.

FIG. 5 illustrates a block diagram for a mechanical system including a current driven actuator. The system may include a driver 510, a current source 520, an actuator 530, a mechanical system 540, and current sensor 550. The mechanical system 540 may be any sort of mechanical system that may be driven by an actuator. Such systems are widely used in automobiles, for example, braking systems.

The actuator 530 may be mechanically coupled to the mechanical system 540, and the actuator 530 may provide a driving force of some sort to the mechanical system 540. The actuator 530 may be driven by a current as described above. The current may be an alternating current (AC) signal where the duty cycle of the AC signal is used to control the actuator 530.

A current source 520 may produce an AC current driving signal to drive the position of the actuator 530. The duty cycle of the current driving signal may be varied to determine the amount of current applied to the actuator 530.

The driver 510 produces control signals to control and drive the current source 520. Further, the driver receives an input from a current sensor 550. The current sensor may be for example a resistor, and a voltage drop measured across the resistor may be used to determine the current output from the current source 520.

Figure 6:
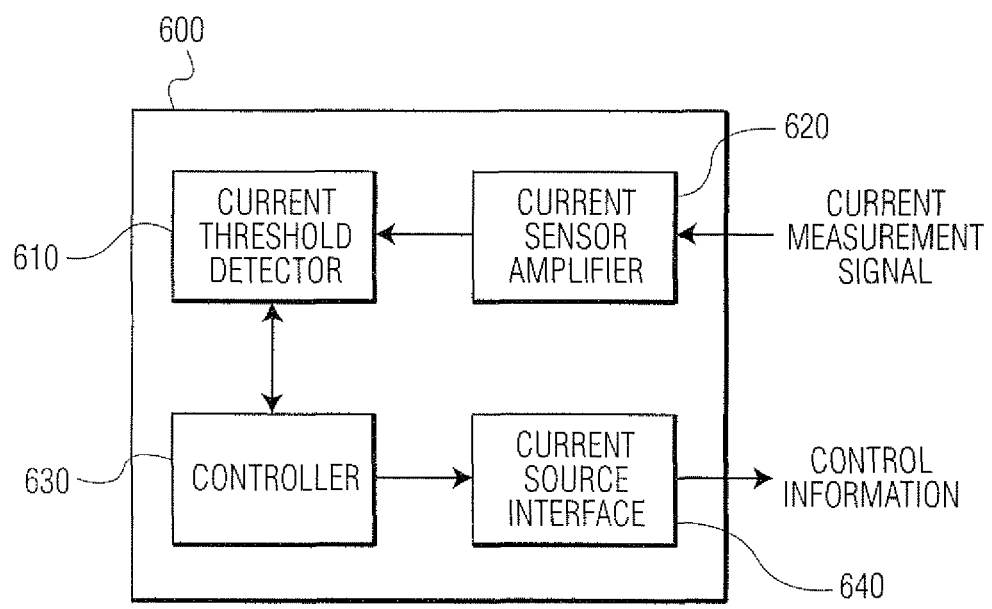
FIG. 6 illustrates a block diagram of a driver.

FIG. 6 illustrates a block diagram of a driver. The driver 600 may be the same as the driver 510 shown in FIG. 5. The driver 600 may include a current threshold detector 610, a current sensor amplifier 620, a controller 630, and a current source interface 640.

The current sensor amplifier 620 may receive a signal from a current measuring device such as a resistor. The current sensor amplifier 620 may convert the received signal into a measured current signal representative of the measured current output of the current source 520. Such a signal may be either analog or digital. If the output is digital, the current sensor may include an analog to digital converter. The current threshold detector 610 may receive the measured current signal which it may compare to a threshold value. The threshold value may be preset in the threshold detector or may be received from the controller 630. Further, the threshold value may be varied during operation based upon operational situations. The current threshold detector 610 indicates whether the measured current is above or below the threshold and provides that indication to the controller 630. Further, the current threshold detector 610 may provide the measured current signal to the controller 630. Alternatively, the controller 630 may also receive the measured current signal directly from the current sensor 620. The threshold detector 610 may be implemented as a separate circuit in the driver. Alternatively, the threshold detector 610 may be implemented using software in the controller 630.

The controller 630 may receive the current threshold indication from the current threshold detector. If the measured current is above the threshold, then the controller 630 may control the current source 520 using a current loop method of operation. If the measured current is below the threshold, then the controller 630 may control the current source 520 by controlling the duty cycle of the current source 520. Further, the controller 630 may determine the amplitude of the current signal to be supplied by the current source. Also, the length of current signal to be generated may be specified by the controller as well. The controller may supply the control information from the controller 630 to the current source interface 640. The current source interface 640 then provides the control information from the controller 630 to the current source 530.

A more detailed description of the operation of the controller 630 and hence the driver 600 will now be provided. The driver 600 may have operational modes including current loop mode, duty cycle mode, and calibration mode. The current loop mode may be implemented when the measured current is above the threshold. In this mode, the offset value in the current measurement is small enough to not be a factor in providing precise current control to the actuator 530. In this mode the controller 630 may use a feedback loop based upon the measured current signal to control the current source to produce the desired current signal and hence the desired actuator response.

In the duty cycle mode the driver 600 controls the current source 520 by specifying the duty cycle of the current source. As described above, there is a linear relationship between the current in the actuator and the duty cycle of the current signal. Based upon calibration information this relationship is understood for the present operating conditions, so the desired current may be obtained by specifying the duty cycle without using any measured current values. As discussed above this may be done because the current offset value resulting from the current sensor may be too large in comparison to the desired current, hence in low current operation, the error between the actual current and the desired current may be very large when using the current loop mode.

In the calibration mode the driver 600 may send a calibration signal to the current source in order to measure the actual current produced in order to characterize the current source 520/actuator 530 combination. For example, a short pulse of 5 ms may be applied to the current source 520/actuator 530 combination. The length of the pulse should be long enough for the current to overcome the time constant and reach its end value, but short enough not to be noticed by a user of the mechanical system. Preferably, the calibration is done just before a low current action may be required as this reduces the effect of changes in the system characteristics. Such calibrations may be done on a periodic basis. For example, the calibration may have an interval that may repeat on the order of seconds for a braking system. The specific period may be chosen to suit the system variations and operational characteristics. Once, the calibration is completed, the driver 600 may then use the duty cycle to accurately drive the current source 520 to a desired current value.

The current driver 600 may be implemented as an integrated circuit. Further, the various elements and functions of the driver 600 may be implemented using a instructions stored on a machine-readable storage medium, which may be read and executed by at least one processor to perform the operations described. Also, while the above described embodiment was described with respect to automotive systems and applications, other embodiments of the invention may be found in other types of systems utilizing current driven actuators.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A current driver for controlling a current source controlled by an alternating current (AC) signal, comprising:
a current sensor configured to measure an output current from the current source;
a threshold detector configured to detect when the measured current is below a threshold value; and
a controller configured to control the current source using a duty cycle of the AC signal when the measured current is below the threshold.

2. The current driver of claim 1, wherein the threshold is 10% to 25% of a maximum current.

3. The current driver of claim 1, wherein the threshold is 5% to 30% of a maximum current.

4. The current driver of claim 1, wherein the controller is further configured to control the current source using the current sensor and a control loop when the measured current is above the threshold.

5. The current driver of claim 1, wherein the controller is further configured to calibrate the current source.

6. The current driver of claim 5, wherein the controller calibrates the current source by applying a signal with a predetermined duty cycle to the current source and measuring the resulting current using the current sensor.

7. The current driver of claim 6, wherein the controller is configured to periodically calibrate the current source.

8. The current driver of claim 6, wherein the applied signal is applied for a predetermined length of time.

9. The current driver of claim 8, wherein the predetermined length of time is selected to prevent an actuator response that would be noticed by a user.

10. The current driver of claim 1, wherein the current driver is an integrated circuit.

11. A method for driving a current source, comprising:
calibrating the current source;
determining that a desired current source output current is below a threshold;
determining a duty cycle for use in driving the current source based upon calibration of the current source and the desired output current; and
applying an alternating current signal with the determined duty cycle to the current source.

12. The method of claim 11, wherein the threshold is 10% to 25% of a maximum current.

13. The method of claim 11, wherein the threshold is 5% to 30% of a maximum current.

14. The method of claim 11, further comprising controlling the current source using a current sensor and a control loop when the desired output current is above the threshold.

15. The method of claim 11, wherein calibrating the current source includes applying a signal with a predetermined duty cycle to the current source and measuring the resulting current using the current sensor.

16. The method of claim 15, wherein calibrating the current source includes periodically calibrating the current source.

17. The method of claim 15, wherein the applied signal is applied for a predetermined length of time.

18. The method of claim 17, wherein the predetermined length of time is selected to prevent an actuator response that would be noticed by a user.

19. A non-transitory program storage device readable by a machine, tangibly embodying a program of instructions executable by the machine to perform method steps of claim 11.

20. A non-transitory program storage device readable by a machine, tangibly embodying a program of instructions executable by the machine to perform method steps of claim 14.

* * * * *